C. E. WARNER.
AUTOMOBILE JACK.
APPLICATION FILED FEB. 15, 1913.
1,100,932.
Patented June 23, 1914.
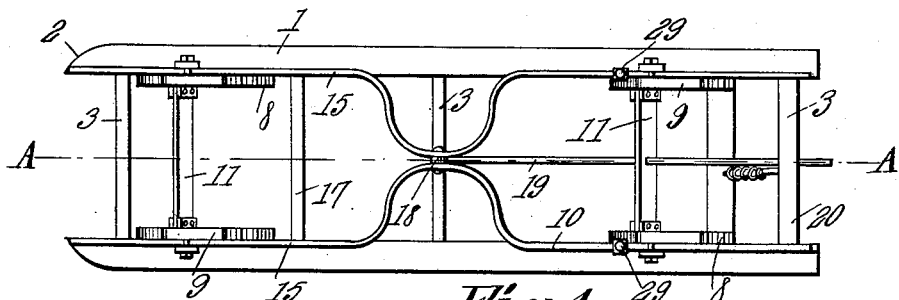
Fig. 1.
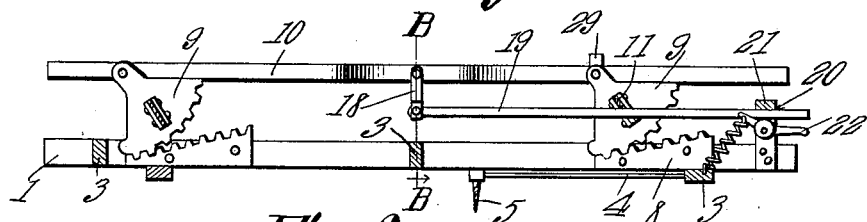
Fig. 2.
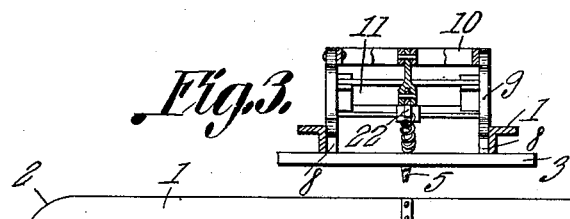
Fig. 3.
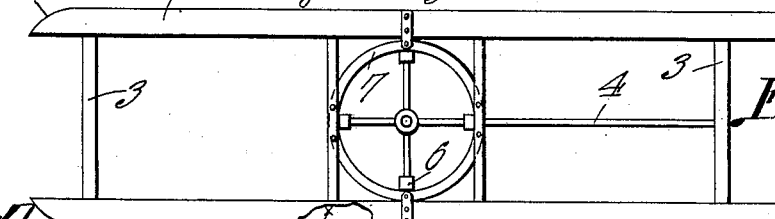
Fig. 4.
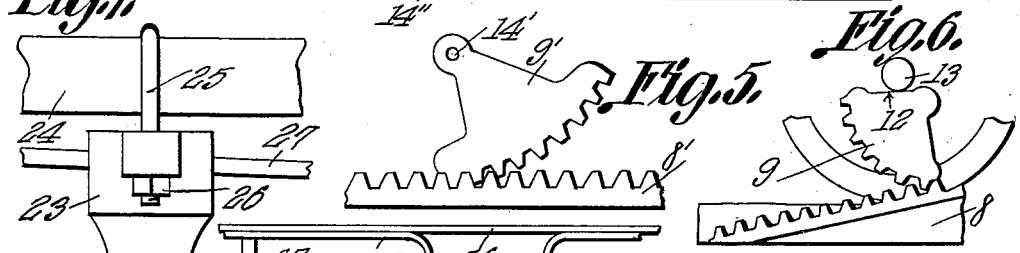
Witnesses
Charles E. Warner, Inventor
by C.A. Snow & Co.
Attorneys
COLUMBIA PLANOGRAPH CO., WASHINGTON, D. C.

UNITED STATES PATENT OFFICE.

CHARLES E. WARNER, OF OTTAWA, KANSAS.

AUTOMOBILE-JACK.

1,100,932.  Specification of Letters Patent.  Patented June 23, 1914.

Application filed February 15, 1913. Serial No. 748,668.

*To all whom it may concern:*

Be it known that I, CHARLES E. WARNER, a citizen of the United States, residing at Ottawa, in the county of Franklin and State of Kansas, have invented a new and useful Automobile-Jack, of which the following is a specification.

This invention relates to improvements in automobile jacks.

The object of the present invention is to provide an improved form of automobile jack for the raising and retaining in a suspended position an automobile to thereby relieve the tires of the automobile weight.

A further object is to provide a jack adapted to utilize the forward movement of the machine to raise the same.

A further object is to provide a jack which may shift and rotate about a vertical axis to thereby render unnecessary an exact alinement of the machine with respect to the jack.

A further object is to provide means whereby the upward movement of the vehicle will be gradually checked and brought to a gradual stop and thereby to avoid unnecessary jars or shocks.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings accompanying this specification and forming a part thereof, the preferable form of the invention is illustrated, in which:—

Figure 1 is a top plan view of my improved jack. Fig. 2 is a vertical cross sectional view thereof, taken on the line A—A of Fig. 1. Fig. 3 is a front cross sectional view taken on the line B—B of Fig. 1. Fig. 4 is a top plan view of the lower frame. Fig. 5 is a view illustrating one form of rack bar and pinion. Fig. 6 is a view of a different form of rack bar and pinion. Fig. 7 is a fragmental view of a device adapted to be secured to the rear axle of the automobile and to extend downwardly therefrom to a level equal to that of the front axle. Fig. 8 is a fragmental view illustrating a modified form of upper frame structure.

Referring to the drawing in which similar reference numerals designate corresponding parts throughout the several views, 1 are guide runners one end of which are beveled as at 2 and extending between which guide runners are the cross bars 3. The said guide runners 1 and the cross brace members 3 constitute a frame which is positioned upon the ground and forms a base for the vehicle elevating means secured thereto. In order to prevent the base frame from shifting longitudinally thereof, and to further provide that it may rotate about a vertical axis extending therethrough the bar 4 is secured to one of the cross brace members 3 and the remote end therefrom is pivotally secured to the floor by the lag bolt 5 or other similar securing means. By so securing the base to the floor it provides that when the automobile or vehicle moves forwardly upon the upper elevating frame which is secured to the said base frame, the movement thereof will tend to shift said base frame longitudinally thereof which force will be taken up by reason of the rods 4 and the pivotal connections 5 secured thereto, and furthermore it allows the forward wheels of the vehicle to hit against the forward beveled portions 2 of the guide runner and the entire base frame will immediately shift about a vertical axis and brings the entire jack construction in proper alinement and relation to the automobile frame.

The construction illustrated in Fig. 4 is a modification of the above described base frame, the difference being that the structure as herein illustrated is provided with a suitable number of rollers 6 positioned centrally thereof and which rollers are adapted to contact with a ring 7, said rollers and ring constituting a turn table whereby the vehicle or automobile having once assumed an elevated position upon the jack may be turned. The tie rods 4 in this instance extend to the central portion of the turntable to which it is secured.

Secured to the inner portions of the guide rails 1 are the inclined rack bars 8, there being preferably two secured to each guide rail 1 adjacent the ends thereof, in engagement with which are mutilated gear wheels or pinions 9. The pinions 9 are rotatably secured to the elevating frame 10 which latter is supported thereby. The mutilated pinions 9 are held in spaced relation by means of the cross strut members 11. As the elevating frame 10 is moved forward by the momentum of the vehicle the pinions 9 are brought into engagement upon the rack bars 8 to roll upwardly thereupon with the result that the frame 10 is elevated and the horizontal force due to the momentum of the vehicle will be gradually changed to a vertical one and the vehicle be suitably elevated thereby. In order that a suitable limit may be provided for the forward and upward movement of the elevating frame 10 the structure is so designed, as more clearly illustrated in Fig. 6 of the drawings, that the rear face 12 of the pinion 9 will come in contact with the axles 13 of the vehicle and any further forward movement of the frame 10 will thereby tend to directly raise the vehicle with the result that the forward and upward movement of the frame will be so limited. It is to be noted in this connection however, that the position of the mutilated pinion 9 upon the rack bar 8 will be governed by the height or clearance of the vehicle axles and may thereby be regulated for the accommodation of vehicles of varying clearances. Furthermore, the position of the pinion 9 with respect to the vehicle axles 13, as illustrated in Fig. 6 of drawings, will be more or less of an emergency stop or limit for the frame 10, there being means provided in connection with the base frame and the elevating frame whereby the latter is locked or secured against a backward and downward movement.

A somewhat modified form of pinion and rack bar is illustrated in Fig 5 of the drawings, the pinion in this case being formed eccentrically and the rack bar mounted level, the result being the same as with the concentric pinion 9 and the inclined rack bar 8. The eccentric pinion 9' is pivotally mounted to rotate about the pivot 14' while the center of the pitch circle is described about the point 14" which is removed or spaced a distance from the pivot 14'.

The elevating frame 10 which is adapted to contact with and raise the vehicle comprises the longitudinal side members 15 bent inwardly at their central portions as illustrated in Fig. 1 and are rigidly secured together at this portion. Fig. 8 of the drawings illustrates a somewhat modified construction of the elevating frame in which the side members 15 are provided with the supplemental members 16 secured thereto and extending therealong, the members 16 being in the nature of an additional brace for the upper elevating frame.

The elevating frame generally designated by the numeral 10 is suitably braced by means of the cross strut members 17 which insures that the entire elevating structure will possess the requisite amount of strength and rigidity. Secured to the central portion of the side members 15 is the downwardly extending rod 18 rigidly secured thereto and to the other end thereof is pivotally secured the rod 19, the said rod 19 extending longitudinally of the frame and passing through a suitable opening formed in the cross struts 11 and extending through an aperture 20 formed in the post 21, a suitable pawl or latch member 22 being pivotally secured to the post 21 and is designed to engage the rod 19 in order to hold the frame 10 in a forward and elevated position. Furthermore the latch member 22 is designed to be within the reach of the operator's foot for the releasing of the rod 19, which allows the elevating frame 10 to move gradually backward and downward by gravity and the vehicle will thereby be returned to its position upon the floor.

As the usual construction of automobile is to form the front axle with a dropped central portion in order that the elevating frame 10 may be maintained level at all times, the device as illustrated in Fig. 7 of the drawing is provided upon the rear axle of the automobile, the object being to secure a projection extending downwardly therefrom, the lower terminal of which is level with the lower or under surface of the front axle. The said device consists of a stub member 23 which is held beneath and securely to the rear vehicle axle 24 by means of the yoke 25 passing thereover and designed to be tightened thereagainst by means of the securing nut 26. The rear axle strut bar 27 extends through a suitable slot cut in the stub member 23 and which allows the said member to be positioned upon any vehicle of the usual construction. The lower surface of the stub member 23 is flared as at 28 and the said member is designed to contact with and be supported upon the side members 15 of the elevating frame.

The side members 15 of the elevating frame are provided with a suitable number of stops 29 projecting upwardly therefrom with which the automobile is adapted to contact when moving forwardly over the elevating frame. From the foregoing it will be apparent that the improved form of jack as herein disclosed may be used with automobiles having different clearances and furthermore means have been provided whereby the entire structure may shift laterally which renders an absolute alinement of the jack with respect to the vehicle unnecessary. Furthermore in the form as illustrated in Fig. 4 of the drawings the desirable feature of combining a turn-table as well as a jack has been shown the construction being simplified by reason of the fact that the vehicle is, when positioned upon the elevating frame, removed from the ground and already supported upon a frame which is easily mounted upon suitable rotatable means. Furthermore by the use of the mutilated pinions as described the automobile is gradually raised while traveling forward, there being no jars or jolts experienced during the elevation of the machine, the extreme position as illustrated in Fig. 6 of the drawing being only experienced when the machine is driven against the elevating frame with a large velocity. The entire construction is so designed and made to withstand hard and strenuous usage.

Having thus fully described the invention what is claimed is:—

1. In an automobile jack, the combination of a base, rack bars secured thereto, an elevating frame, pinions rotatably secured thereto and engaging said rack bars, stops disposed upon the elevating frame and adapted to position the vehicle frame with respect to said elevating frame, said pinions adapted to contact with said vehicle frame to limit the movement of said elevating frame.

2. In an automobile jack, the combination of a base frame, an elevating frame, rack bars inclinedly secured to said base frame, mutilated quadrantal pinions rotatably secured to said elevating frame, stops disposed upon said elevating frame adapted to position said elevating frame with respect to the axles of a vehicle, said pinions adapted to contact with said vehicle axle to limit the forward movement of said elevating frame.

3. In an automobile jack the combination of a base, an elevating frame, pinions pivotally secured to said elevating frame and engaging the said base, stops disposed upon the elevating frame adapted to position the vehicle frame with respect to the elevating frame, said stops holding a vehicle frame in the path of movement of the pinions to limit the movement thereof.

4. The combination with a base, a track secured thereto, an elevating frame, pinions rotatably secured thereto and engaging said track, means for holding a vehicle frame in the path of movement of said pinions to thereby limit the movement of said elevating frame, and means for holding said elevating frame in elevated position.

In testimony that I claim the foregoing as my own, I have hereto affixed my signature in the presence of two witnesses.

CHARLES E. WARNER.

Witnesses:
 H. H. HAYES,
 J. R. FINLEY.

---

Copies of this patent may be obtained for five cents each, by addressing the "Commissioner of Patents, Washington, D. C."